Jan. 22, 1929.　　　H. M. PLUMMER, JR　　　1,699,713
ROLLER BEARING
Filed Dec. 3, 1925　　　2 Sheets-Sheet 1
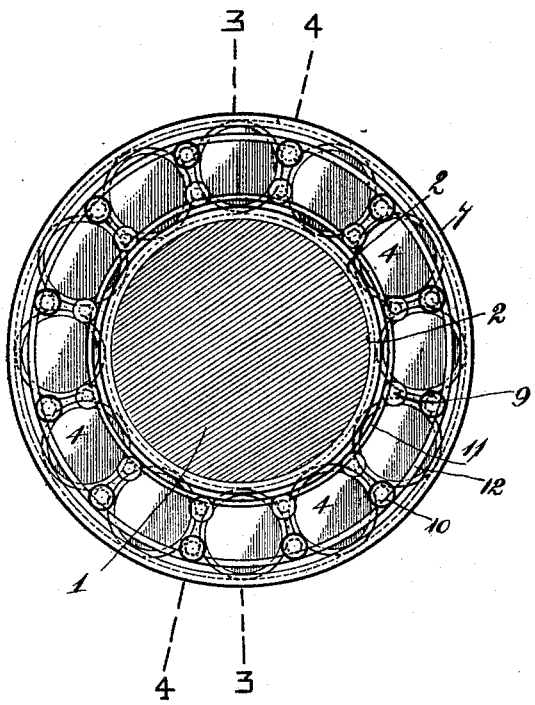
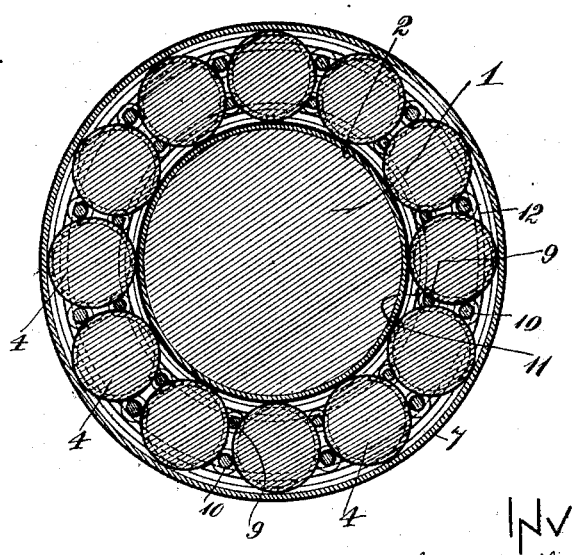

Jan. 22, 1929.  H. M. PLUMMER, JR  1,699,713
ROLLER BEARING
Filed Dec. 3, 1925   2 Sheets-Sheet 2

INVENTOR:
Henry M. Plummer, Jr.
BY
ATTORNEYS:

Patented Jan. 22, 1929.

1,699,713

UNITED STATES PATENT OFFICE.

HENRY M. PLUMMER, JR., MELROSE, MASSACHUSETTS.

ROLLER BEARING.

Application filed December 3, 1925. Serial No. 73,002.

My invention relates to roller bearings of a type well known and which may be used in a variety of places. The purpose of my invention is to reduce friction so far as possible and without any undue enlargement of the box within which the rollers are contained, also the construction of a device which shall require as little machine work as possible and so reduce the expense of construction.

My invention will be understood by reference to the drawings in which it is shown in its preferred form.

Fig. 1 is a cross section of a shaft showing the bearings in position thereon;

Fig. 2 being a similar view showing the bearings in section and taken on line 2—2 of Fig. 4.

Fig. 3 is a section on line 3—3 of Fig 1;

Fig. 4 a section on line 4—4 of Fig. 1;

Fig. 5 being an enlarged fragmentary end view showing the relation of the large and small rolls; and Fig. 6 a corresponding sectional view taken between the ends of one of the large rolls.

Figure 3:
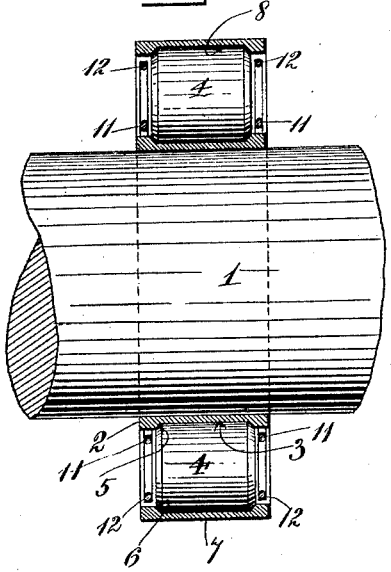
Figure 4:
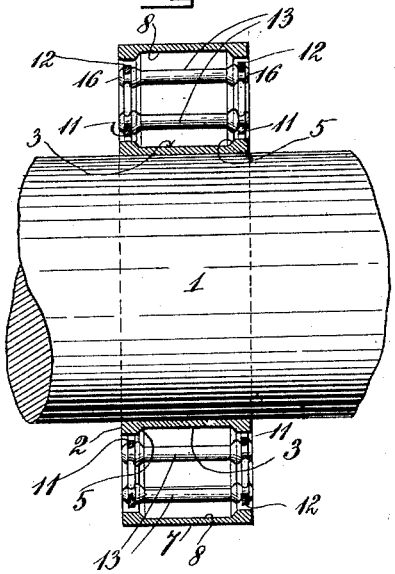
Figure 5:
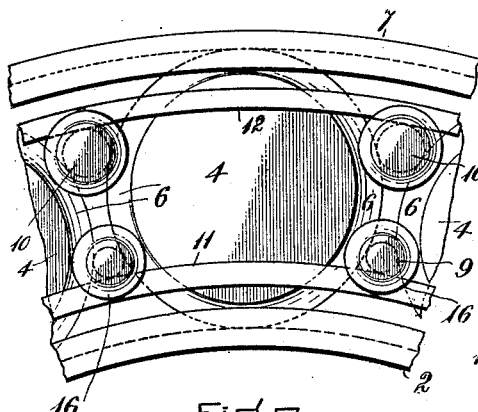
Figure 6:
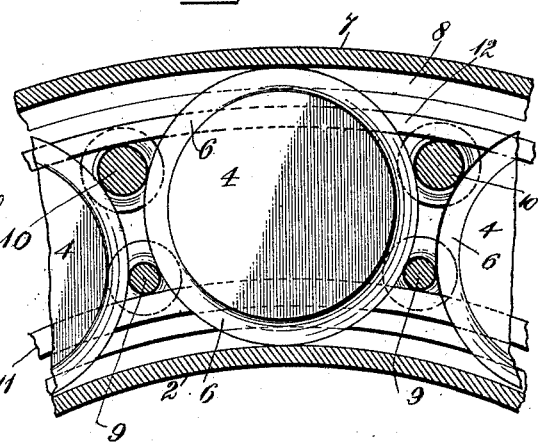
Figure 7:
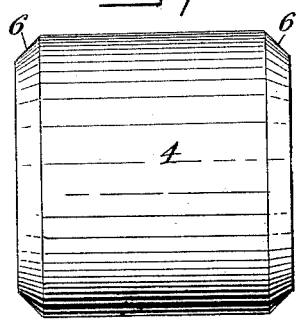
Fig. 7 is an elevation of one of the large rolls.
Figure 8:
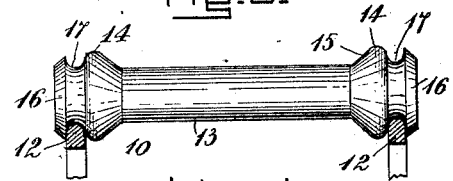
Fig. 8 is a corresponding elevation of one of the small rolls shown in relation to the ring which supports it.

In the drawings 1 is a shaft to which the bearings are applied. Around this shaft and fast thereon is preferably the ring 2 which is grooved as at 3 to form a race for the bearing rolls 4 which run in the race 3. It will be noted that the walls 5 of the race 3 are shaped with relation to the bevelled edge 6 of the bearing rolls 4 so that the walls 5 will prevent lateral movement of the bearing rolls while allowing them to turn with but little friction. The race may be otherwise constructed, its purpose being to keep the bearing from sliding endwise on the shaft.

7 is an outer grooved ring having a race 8 in all respects, except of course its diameter, like the race 3 and in cross section shaped like the race 3 so as to fit the bearing rolls 4. The ring 7 may be attached to a hanger, not shown, in the usual way, or it may be the movable element rotatable about a stationary axle.

Between each pair of bearing rolls are two sets of smaller rolls 9 and 10, the inner set being supported by a ring 11 and the outer set being guided and restrained by a ring 12. These sets of rolls, though differing in diameter, are alike in general shape, each comprising a shank 13 and an enlargement 14 at each end connected to the shank by a bevelled bearing surface 15 which is at such an angle as will engage the bevelled edge 6 of the bearing rolls. In each enlargement 14 is a groove 17, the outer head 16 of each enlargement being sufficient in size to form a definite edge for the groove 17 to hold in it one of the rings 11 or 12 and yet sufficiently small or properly shaped to allow its ring 11 or 12 to be sprung over it in the assembly of the bearings.

The shanks of the inner set of rolls 9 are of such diameter that each will lie in engagement with its adjacent bearing rolls 4, being held in place and resting on the ring 11, the body of the bearing rolls 4 engaging the shanks 13 of the spacing rolls 9 and the bevelled edges 6 of the bearing rolls 4 engaging the surfaces 15 of the spacing rolls. The set of rolls 10 are similarly shaped but slightly larger in diameter so as to act as retaining rolls to keep the bearing rolls 4 and the supporting rolls 9 in place, being themselves held in place by the ring 12, their surfaces 15 engaging the bevelled edges 6 of the bearing rolls. Thus the pressure on the bearing is sustained by the bearing rolls and the bearing rolls themselves are kept properly spaced about the shaft by the spacing and retaining rolls, while in each case the parts move or are moved with relation to each other with the least possible friction because of their rolling contact and the shape of their contacting surfaces.

In the embodiment of my invention shown in the drawings and described above it will be noted that there is a bearing system comprising the bearing rolls 4 which hug the shaft and between them spacing rolls 9, the shanks of which are of proper size to keep all the bearing rolls at equal distances apart and which are held in position against the bearing rolls by a ring 11, of proper diameter, on which they move. In like manner the shanks of the retaining rolls 10 are of proper diameter to rest between the bearing rolls 4 and are held in place by the retaining ring 12 which when in place holds the system in proper relation to the shaft 1. An outer ring or casing 7 surrounds the whole. The complementary contacting edges of the several rolls keep them from endwise movement with a minimum of, or no, friction. Moreover the means for holding the bearing from sliding endwise on the shaft may be otherwise constructed and may be integral therewith.

The ring 7 of the stationary element may be of any convenient shape on its exterior according to the specific use to which it is to be put. This will be well understood by those skilled in the art. It may also be the movable element as in the case of an automobile wheel and axle when the axle is stationary.

I claim:

1. The roller bearing above described adapted to support a shaft and comprising a series of bearing rollers adapted to be located about said shaft to move therewith, and means for preventing said rolls from endwise movement, and two independent series of rolls located to space said bearing rolls apart, one series of rolls being located nearer said shaft than the centre of said bearing rolls and the other series farther from said shaft than the centre of said bearing rolls, and means common to each series of rolls whereby the rolls of each series will be prevented from endwise movement.

2. A roller bearing adapted to support a shaft and comprising a series of bearing rolls adapted to be located about a shaft, means for preventing said rolls from endwise movement, and a series of rolls to space said bearing rolls apart, the rolls of said series being located nearer said shaft than is the centre of said bearing rolls, and means common to all the rolls of said series whereby the rolls of said series will be prevented from movement in radial lines with relation to the axis of said shaft, said means comprising two rings, one surrounding the outer series of rolls and the other lying between the inner series of said rolls and said shaft.

3. A roller bearing adapted to support a shaft and comprising a series of bearing rolls adapted to be located about a shaft, means for preventing said rolls from endwise movement, and a series of rolls to space said bearing rolls apart, the rolls of said series being located farther from said shaft than is the centre of said bearing rolls, and a single means whereby the rolls of said series will be prevented from movement in radial lines with relation to the axis of said shaft.

4. The roller bearing above described adapted to support a shaft and comprising a series of bearing rolls adapted to be located about said shaft to move therewith, and means for preventing said rolls from endwise movement, and two series of rolls located to space said bearing rolls apart, one series of rolls being located nearer said shaft than the centre of said bearing rolls and the other series farther from said shaft than the centre of said bearing rolls, and means common to the rolls of each series whereby the rolls of each series will be prevented from movement in radial lines with relation to the centre of said shaft, said means comprising two rings, one holding the series of rolls which are located nearer said shaft against said bearing rolls and the other enclosing the series of rolls farther from the shaft and holding them against said bearing rolls.

5. The bearing above described comprising an outer and an inner ring, each having a race, said inner ring being adapted to be attached to a shaft and said outer ring being adapted to be attached to a support, a series of bearing rolls adapted to run in said races, two series of spacing rolls, each roll of each series being located between two of said bearing rolls and one series being located above and the other below a line joining the axes of said bearing rolls, and means for holding each series of rolls in contact with said bearing rolls comprising two independent rings, one engaging each series of spacing rolls.

6. The bearing above described, comprising a series of rolls adapted to be mounted about a shaft, and means whereby they will be prevented from longitudinal movement, and two series of rolls, each roll of each series being located between two of said bearing rolls, one series being located nearer the centre of the shaft than the other and serving to separate said bearing rolls, and the other series to retain said bearing rolls in circular conformation and two rings, one adapted to engage all of said separating rolls and the other to engage all of said retaining rolls.

HENRY M. PLUMMER, Jr.